Nov. 9, 1948.  L. LEE, II  2,453,328
CONTROL APPARATUS FOR INTERNAL-COMBUSTION ENGINES
Filed Aug. 22, 1945  2 Sheets-Sheet 2

INVENTOR.
LEIGHTON LEE II
BY
Lester W Clark
AGENT

Patented Nov. 9, 1948

2,453,328

UNITED STATES PATENT OFFICE 2,453,328

CONTROL APPARATUS FOR INTERNAL-COMBUSTION ENGINES

Leighton Lee, II, West Hartford, Conn., assignor, by mesne assignments, to Niles-Bement-Pond Company, West Hartford, Conn., a corporation of New Jersey Application August 22, 1945, Serial No. 612,082

13 Claims. (Cl. 123—119)

The present invention relates to control apparatus for internal combustion engines, and particularly to apparatus for controlling the fuel supply and the ignition timing on such engines.

An object of the present invention is to provide an improved means for controlling the delivery of a set of injection pumps for supplying fuel directly to the cylinders of an internal combustion engine.

Another object is to provide such improved pump delivery control mechanism which responds to the rate of flow of combustion air to the engine.

A further object is to provide improved injection pump delivery control mechanism for controlling the delivery of the pumps under engine idling conditions.

Another object is to provide idling and delivery control apparatus which provides for a fixed minimum delivery per stroke of the pumps under idling conditions.

Another object is to provide such fixed minimum delivery control means which may be selectively removed to permit the pump delivery to be completely cut off.

Another object of the present invention is to provide, in a fluid motor operated control device, improved means for preventing hunting or overshooting of the motor.

A further object is to provide improved means for controlling the ignition timing in accordance with the setting of the injection pump delivery control mechanism and in accordance with the rate of flow of fuel to the engine.

Figure 1:
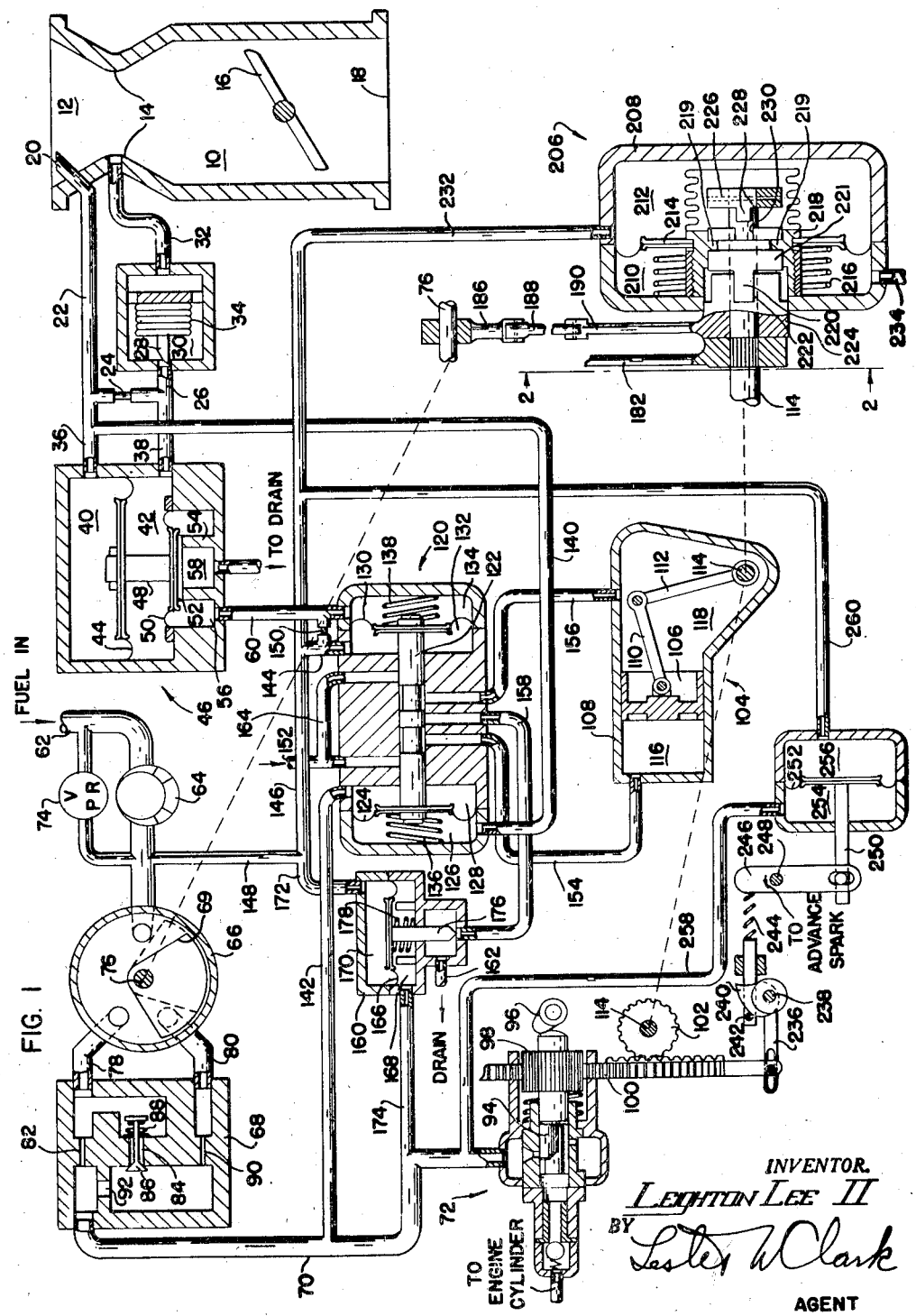
Figure 2:
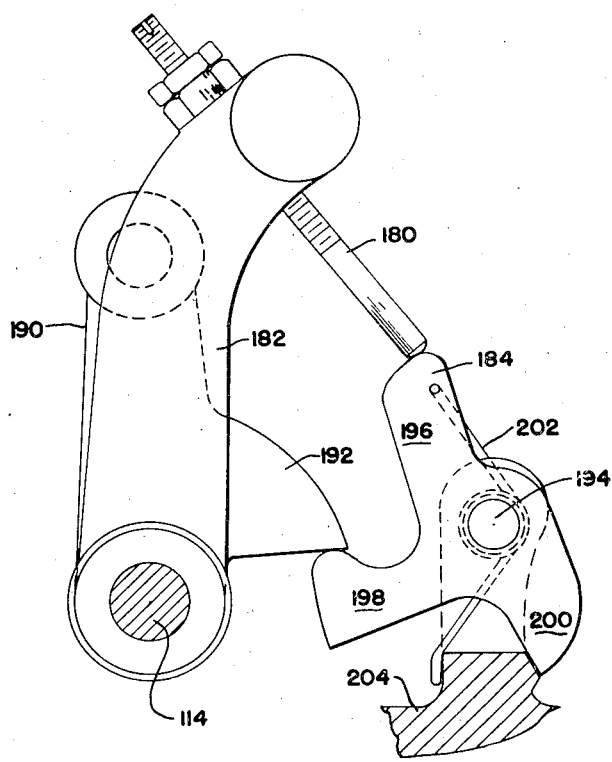

Other objects and advantages of my invention will become apparent from consideration of the appended specifications, claims and drawings, in which Figure 1 illustrates, somewhat diagrammatically, the principles of my invention as applied to a fuel supply and ignition timing control system for an internal combustion engine, and Figure 2 is a view taken on the line 2—2 of Figure 1, looking in the direction of the arrows.

Referring now to Figure 1, there is shown an air conduit 10, thru which combustion air for an engine flows from an entrance 12, past a venturi 14 and a throttle 16, to a discharge outlet 18. The outlet 18 may deliver air either directly to the engine intake manifold or to the intake of the supercharger. In some cases, a supercharger may be provided anterior to the entrance 12.

The venturi 14 follows the well-known laws governing the characteristics of such devices. Therefore there is established between the entrance 12 and the throat of venturi 14 a differential of air pressures, which is a measure of the velocity of the air flowing thru conduit 10.

This difference of air pressures sets up a flow of air thru a secondary air passage which may be traced from an impact tube 20 opening into entrance 12, thru a conduit 22, a restriction 24, a conduit 26, past a valve 28 into a chamber 30, and thru a conduit 32 to the throat of venturi 14.

The valve 28 is positioned by a sealed flexible bellows 34, mounted in the chamber 30. The bellows 34 proper contains a fluid having an appreciable coefficient of thermal expansion, so that the position of valve 28 varies with both the pressure and temperature of the air in the chamber 30. By positioning the valve 28 in accordance with the pressure and temperature of the air, it may be made to regulate the pressure drop across restriction 24 substantially in accordance with the mass of air flowing thru air passage 10 per unit time. This manner of pressure and temperature compensation is more fully described and claimed in the co-pending application of Milton E. Chandler, Serial No. 490,281, filed June 10, 1943, and now Patent No. 2,393,144.

The pressure drop established across restriction 24 is communicated thru conduits 36 and 38 to chambers 40 and 42, respectively. The chambers 40 and 42 are separated by a flexible diaphragm 44 and are located in a pressure meter generally indicated at 43.

It may be seen that the force acting downwardly on the diaphragm 44 due to the difference in pressure in chambers 40 and 42 is a measure of the rate of flow of air to the engine. Attached to the center of diaphragm 44 is a valve stem 48, which extends thru another diaphragm 50 and carries a valve 52 on the opposite side of diaphragm 50. The valve 52 cooperates with an annular seat 54, and regulates the flow between an inlet chamber 56 outside the seat 54 and an outlet chamber 58 inside the seat 54. Fuel under pressure is supplied thru a conduit 60 to the inlet chamber 56, by means to be described later.

If the air pressure differential acting on diaphragm 44 increases, the valve 52 is moved downwardly until the flow into the outlet chamber is so restricted as to increase the pressure in inlet chamber 56 sufficiently to balance the increased downward force of the diaphragm 44. Similarly, if the air flow decreases, the force acting downwardly on diaphragm 44 is not sufficient to balance the fuel pressure acting upwardly on diaphragm 50 so that the valve 52 opens until its opening movement has relieved the pressure in inlet chamber 56 sufficiently so that the forces on the diaphragms are again balanced. It may therefore be seen that the pressure meter 46 operates to maintain a pressure in chamber 53 which is a measure of the rate of flow of air to the engine.

Fuel for the engine comes from a tank or other source (not shown) and flows thru a conduit 62, past an engine driven pump 64, a mixture control unit 66, a jet system 68, and thru a conduit 70 to the injector pumps, one of which is illustrated at 72.

The pump 64 is provided with a pressure relief valve 74 which maintains its discharge pressure at a substantially constant value.

The mixture control unit 66 includes a disc valve 69 fixed on a shaft 76, which is manually rotatable by means not shown. When the disc valve 69 is in the full-line position shown in the drawing, fuel can flow from the mixture control unit to the jet system only thru a conduit 78. When the valve 69 is moved to the dotted line position shown in the drawing, then fuel can flow thru both the conduit 78 and another conduit 80 to the jet system 68. The full-line position of the valve 69 is known as the "lean" position of the mixture control, and the dotted line position is termed the "rich" position. The valve 68 may also be moved to a position wherein it cuts off all the flow of fuel to the jet system 68. This latter position is known as the "cut-off" position.

Fuel entering the jet system 68 thru conduit 78 passes thru a fixed restriction or jet 82, or a restriction 84 controlled by a valve 86, biased to a closed position by a spring 88. Fuel entering the jet system thru conduit 80 passes thru a fixed restriction 90. Fuel passing thru restrictions 84 and 90 also passes thru another fixed restriction 92.

The injector pump appearing at 72 is of conventional form, and includes a plunger 94 reciprocated by a cam 96, driven by the engine. The plunger carries a pinion 98, which mates with a rack 100. By reciprocating the rack 100 the plunger may be rotated on its axis. The plunger is provided with a helical groove cooperating with the inlet port thru which fuel is admitted to the cylinder ahead of the plunger. By rotation of the plunger, the point in the plunger travel at which the inlet port is closed and pumping begins may be varied. In this manner the quantity of fuel delivered per stroke of the plunger is controlled.

The rack 100 is positioned by a gear 102 operated by a fluid servo-motor 104. The motor 104 includes a piston 106 reciprocating in a cylinder 108. A connecting rod 110 connects the piston 106 to a crank arm 112 attached to a shaft 114 on which the gear 102 is fixed.

The piston 106 separates the cylinder 108 into two chambers, 116 and 118.

Fluid is selectively supplied under pressure to chambers 116 and 118 under the control of a valve mechanism generally indicated at 120. The valve mechanism 120 includes a spool valve 122 extending therethru. At its left end the valve 122 is attached to a diaphragm 124 which separates two expansible chambers 126 and 128. At its right end the valve 122 is attached to a diaphragm 130 which separates a pair of expansible chambers 132 and 134. A pair of opposed springs 136 and 138 may be used acting in opposite directions on the diaphragms 124 and 130 to aid in maintaining the valve 122 at its central position.

The chamber 126 is connected thru a conduit 140 to the conduit 22 leading to the impact tube 20. The chamber 128 is connected thru a conduit 142 to the fuel conduit 70 on the downstream side of the jet system 68. The chamber 132 is connected thru conduits 144, 146 and 148 to the fuel line on the upstream side of the jet system. The chamber 134 is connected to the conduit 60, wherein as previously described, the pressure is maintained proportional to the rate of flow of air to the engine. The conduit 60 receives its supply of fuel from conduit 144 thru restriction 150.

The conduit 140 provides a vent for chamber 126. It may be seen that the pressure in chamber 134 acts to the left on the diaphragm 130 and therefore a force is applied to the left on valve 122 which is a measure of the rate of flow of air to the engine. At the same time the fuel pressure on the upstream side of the jet system is communicated to chamber 132, where it acts to the right on diaphragm 130. The fuel pressure downstream from the jet system is communicated to chamber 128 where it acts to the left on diaphragm 124. For a given area of a jet system open to the flow of fuel, the pressure drop across it is a measure of the rate of flow of fuel therethru. Therefore, it may be seen that the net force acting to the right on valve 122 due to the difference in the pressure in chambers 132 and 128 is a measure of the rate of flow of fuel to the engine. Therefore, the valve 122 is positioned in accordance with the balance of two forces, one proportional to the rate of flow of fuel to the engine and the other proportional to the rate of flow of air to the engine.

The pressure in chamber 126 is small as compared to the pressures in the other three chambers 128, 132 and 134. Furthermore, it is substantially constant, as compared to the variations in pressure in the other three chambers. In addition, any changes in that pressure act on valve 122 in the proper direction to correct the fuel flow for variations in the density of the entering air.

As long as these two forces are balanced the valve 122 remains in the position shown in the drawing. If the air flow exceeds fuel flow, the valve 122 is moved to the left. This opens a path for the flow of motive fluid to the motor 104 from a suitable source such as a fuel pump or oil pump thru a conduit 152, past the valve 122, thru conduit 154 to chamber 116 at the left end of the motor cylinder 108. At the same time, chamber 118 at the right end of motor cylinder 108 is connected thru a conduit 156 and past valve 122 to a conduit 158 and anti-hunting valve mechanism 160 to a drain conduit 162. The drain conduit may, for example, be connected back to fuel or oil tank, as the case may be.

This position of valve 122 establishes a high pressure on the left side of piston 106 and a low pressure on the right side, thereby causing piston 106 to move to the right, rotating shaft 114 clockwise and moving the injector pump delivery control rack upward. This rotates the plunger 94 in a direction to increase the pump delivery. The increase of the pump delivery continues until the fuel flow thru the jet system is increased sufficiently that the force due to the fuel pressure differential across it, acting to the right on valve 122, has restored the valve to its former central position.

In a similar manner, if the fuel flow exceeds the air flow for any reason, the valve 122 is moved to the right thereby supplying high pressure thru to chamber 118 thru conduit 164, past valve 122 and thru conduit 156. Chamber 116 is then connected thru conduits 154 and 158 to the drain. This produces a movement of piston 106 to the left and a corresponding movement on the pump delivery control in a decreasing direction until the fuel and air flows are again balanced.

Under conditions of high engine load a small change in the position of the pump delivery control racks can produce a large change in the rate of fuel flow because of the high speed at which the engine is running and the rapid reciprocation of the injector pumps. In order to prevent the establishment of a hunting condition because of the rapidity of response from this system under such conditions, I have provided the anti-hunting valve mechanism illustrated at 160. This mechanism includes a diaphragm 166 separating a pair of expansible chambers 168 and 170. Fuel at the pressure upstream from the jet system is conducted thru conduits 148 and 172 to chamber 170. Fuel at the pressure downstream from the jet system is conducted thru conduit 174 to chamber 168. The diaphragm 166 carries at its center a valve 176 which controls the passage of fuel from conduit 158 to drain conduit 162. This valve is biased open by a spring 178. When the fuel pressure differential across the jet system is small the spring 178 holds valve 176 open and the motor 104 is permitted to move as fast as it can. As the rate of flow of fuel thru the jet system increases the fuel pressure differential across it, acting on diaphragm 166, overcomes the spring 178 and moves valve 176 toward a closed position. This restricts the flow of fluid from the servomotor to the drain and thereby slows movement of the servomotor. In this way, the motor is prevented from running so rapidly as to establish a hunting condition.

I have provided means for establishing a fixed minimum pump delivery control so that when the engine is idling the pump delivery remains constant. Under such conditions the measurement of air flow by the venturi is quite erratic because of the small flow of air compared to the large size of the venturi. Therefore it is desired to have the pump delivery independently controlled under such circumstances. This is done, in the arrangement shown, by designing the springs 136 and 138 so that they move the valve 122 in a pump delivery decreasing direction when the pressure in the chamber 134 is small, as is the case under idling conditions. The servomotor 104 then tries to rotate the shaft 114 in the clockwise direction (as viewed in Figure 2) and does so rotate it until an adjustable screw 180 (see Figure 2) carried at the end of an arm 182 fixed on the shaft 114, engages a stop member 184. The pump capacity cannot then further decrease.

An extension of shaft 76 operates, thru an arm 186 and a link 188, an arm 190, which is freely rotatable on the shaft 114. The arm 190 is provided with a projection 192 (see Figure 2). The stop member 184 is pivotally mounted at 194. This stop member is provided with three substantially radially projecting fingers 196, 198 and 200. A coil spring 202 encircles the pivotal mounting 194 and has its opposite arms projecting so that one engages a stationary frame member 204, and the other engages the finger 196. The spring 202 thereby biases the stop member 184 for clockwise rotation as viewed in Figure 2 so as to maintain the finger 200 in engagement with the frame 204. This maintains the finger 196 in the path of movement of screw 180, so as to determine the minimum delivery setting of the injector pumps. The finger 198, however, lies in the path of movement of the projection 192 of arm 190. The relationship is such that when the mixture control shaft is moved to its cut-off position, projection 192 engages finger 198 and rotates the stop member 184 counterclockwise against spring 202, thereby removing the finger 198 from the path of the screw 180 and permitting the pump delivery control to move to its zero delivery position.

It may be noted that when the mixture control 76 is moved to cut-off the fuel pressure differential across the jet system becomes very high so that the valve 122 is moved in a pump delivery decreasing direction. Therefore, the servo-motor 104 promptly moves the pump delivery control to its zero delivery position and the stop 184 no longer interferes with this movement.

When the engine is not running, it is desirable to be able to position the pump delivery control mechanism manually. Therefore, I have provided a clutch mechanism which is operable to connect the pump control mechanism to the mixture control shaft 76 when the engine is not operating. This clutch mechanism is shown generally at 206 in Figure 1. It includes a casing 208 separated into a pair of expansible chambers 210 and 212 by diaphragm 214. The diaphragm 214 is biased to the right by a spring 216. The diaphragm 214 carries at its center a sleeve 218. This sleeve 218 has a central bore with a pair of diametrically opposite projections 219 extending into the bore. A movable clutch member 221 is mounted in the bore of sleeve 218. The member 221 is provided with a circumferential groove to receive the projections 219. The member 221 may be assembled with sleeve 218 by aligning the projections 219 with a pair of notches 230 in the surface of member 221 and inserting the member 221 thru the sleeve until the projections enter the groove on member 219 and then rotating the member 219 relative to sleeve 218. The member 219 has a projection 220 which mates with a recess 222 formed on the hub 224 of the arm 190. The shaft 114 projects thru the hub 224 and the sleeve 218 and carries at its end a clutch member 226 including a pair of diametrically opposite projections 228 extending toward the sleeve 218. The notches 230 on the clutch member 221 are adapted to receive the projections 228. The chamber 212 is supplied with fuel from the discharge of the pump 64 thru conduits 148, 146 and 232. The chamber 210 is vented to the atmosphere as shown at 234.

When the engine is not running there is substantially atmospheric pressure in the chamber 212 and spring 216 then moves the diaphragm 214 and sleeve 218 to the right, so that projection 228 may enter the recess 230. Thereafter, the hub 224, the clutch member 221 and the clutch member 226 rotate together, so that operation of the mixture control shaft 76 results in changing the position of the pump capacity control rack. As soon as the engine starts, fuel under pressure is supplied to chamber 212, where it acts on diaphragm 214 to compress spring 216 and release the clutch, so that the mixture control shaft 76 and the pump delivery control shaft 114 are thereafter separately movable.

I have provided an arrangement whereby the ignition timing control may be coordinated with the pump delivery control. Arm 236 is pivotally connected to the end of the rack 100 thru a suitable pin and slot connection. The arm 236 is attached to a shaft 238 carrying a cam 240. The cam 240 cooperates with a follower 242 which tensions a spring 244 acting on one end of lever 246. The lever 246 is attached at its center to a shaft 248 connected to any suitable ignition timing control device. The opposite end of lever 246 is connected thru a suitable pin and slot connection to a rod 250 positioned by diaphragm 252. The diaphragm 252 separates two expansible chambers 254 and 256. The chamber 254 is connected thru a conduit 258 to the fuel line at the downstream side of the jet system, and the chamber 256 is connected thru conduits 260, 146 and 148 to the fuel line on the upstream side of the jet system.

From the foregoing, it may be noted that the ignition timing control is positioned by the fuel pressure differential acting in opposition to the pump delivery control position. In an injector pump system two factors determine the fuel pressure differential, one of these is the pump delivery control position, and the other factor is the engine speed. By placing these two factors against each other in this ignition timing control, it is possible to regulate the ignition timing in accordance with engine speed. The cam 240 may be controlled to provide ignition control according to any desired function of engine speed.

While I have shown and described a preferred embodiment of my invention, other modifications thereof will readily occur to those skilled in the art, and I therefore intend my invention to be limited only by the appended claims.

I claim as my invention:

1. A fuel supply system for an internal combustion engine, comprising injection pump mechanism for supplying fuel to the cylinders of said engine, means for varying the delivery of said pump mechanism, motor means for operating said delivery varying means, a conduit for combustion air flowing to said engine, means associated with said conduit for producing two unequal pressures whose difference is a measure of the rate of flow of combustion air to said engine, a conduit for fuel flowing to said pump mechanism, a metering restriction in said conduit, an expansible chamber, a restricted inlet passage for conveying fuel from said conduit to said chamber, a restricted outlet passage for said chamber, means for varying the restriction in one of said passages in response to the difference of said unequal pressures so as to vary the pressure in said chamber as a function of the rate of air flow, and means responsive to the pressure in said chamber and to the fuel pressure differential across said metering restriction for controlling said motor means.

2. A fuel supply system for an internal combustion engine, comprising injector pump mechanism for delivering fuel to the cylinders of said engine, means for varying the delivery of said pump mechanism between zero delivery and maximum delivery, means responsive to the rate of combustion air flowing to said engine for operating said delivery varying means, and means for limiting the minimum delivery which can be established by said delivery varying means at a value greater than zero delivery.

3. A fuel supply system for an internal combustion engine, comprising injector pump mechanism for delivering fuel to the cylinders of said engine, means for varying the delivery of said pump mechanism, means responsive to the rate of combustion air flowing to said engine for operating said delivery varying means, stop means for limiting the movement of said delivery varying means in a delivery decreasing direction, a conduit for fuel flowing to said injector pump mechanism, cut-off valve means for closing said conduit, and means operable concurrently with movement of said cut-off valve means to closed position to render said stop means ineffective so that said delivery varying means can move to its zero delivery position.

4. A fuel supply system for an internal combustion engine, comprising injector pump mechanism for delivering fuel to the cylinders of said engine, means for varying the delivery of said pump mechanism including a rotatable shaft, an arm fixed on said shaft, a manually movable arm rotatable on said shaft, stop means for limiting the movement of said fixed arm and said shaft, cam means on said manually movable arm for engaging said stop means and moving it out of the path of movement of said fixed arm, and clutch means operable to engage said manually movable arm with said shaft for concurrent movement.

5. A fuel supply system for an internal combusion engine, comprising fuel injector pump mechanism for delivering fuel to the cylinders of said engine, means for varying the delivery of said pump mechanism, fluid motor means for operating said delivery varying means, conduit means for supplying motive fluid to said fluid motor means, a conduit for fuel flowing to said pump mechanism, a metering restriction in said fuel conduit, means for variably restricting said motive fluid supply conduit means, and means responsive to the fuel pressure differential across said metering restriction for operating said variable restricting means to increasingly restrict said motive fluid supply conduit as said fuel pressure differential increases so as to prevent hunting of said fluid motor means.

6. Control apparatus for an internal combustion engine, comprising injector pump mechanism for delivering fuel to the cylinders of said engine, means for varying the delivery per engine revolution of said injector pump mechanism, a conduit for fuel flowing to said injector pump mechanism, a metering restriction in said fuel conduit, means for controlling the ignition timing of said engine, means operable concurrently with said delivery varying means to operate said ignition timing control means to advance said timing as said delivery is increased, and means responsve to the fuel pressure differential across said metering restriction for operating said ignition timing control means to retard said timing as said fuel pressure differential is increased.

7. A fuel supply system for an internal combustion engine, comprising injection pump mechanism for supplying fuel to the cylinders of said engine, means for varying the delivery of said pump mechanism, motor means for operating said delivery varying means, a conduit for combustion air flowing to said engine, means associated with said conduit for producing two unequal pressures whose difference is a measure of the rate of flow of combustion air to said engine, a conduit for fuel flowing to said pump mechanism, a metering restriction in said conduit, an expansible chamber, a restricted inlet passage for conveying fuel from said conduit to said chamber, a restricted outlet passage for said chamber, means for varying the restriction in one of said passages in response to the difference of said unequal pressures so as to vary the pressure in said chamber as a function of the rate of air flow, and means responsive to the pressure in said chamber and to the fuel pressure differential across said metering restriction for controlling said motor means so as to increase the pump delivery when said chamber pressure increases and to decrease the pump delivery when said fuel pressure differential increases.

8. A fuel supply system for an internal combustion engine comprising a conduit for combustion air flowing to said engine, means associated with said conduit for producing two unequal pressures whose difference is a measure of the rate of flow of combustion air to said engine, a conduit for fuel flowing to said pump mechanism, a metering restriction in said conduit, means for varying the fuel flow thru said fuel conduit, an expansible chamber, a restricted inlet passage for conveying fuel from said conduit to said chamber, a restricted outlet passage for said chamber, means for varying the restriction in one of said passages in response to the difference of said unequal pressures so as to vary the pressure in said chamber as a function of the rate of air flow, and means responsive to the pressure in said chamber and to the fuel pressure differential across said metering restriction for controlling said fuel flow varying means.

9. Control apparatus for an internal combustion engine, comprising injector pump mechanism for delivering fuel to the cylinders of said engine, means for varying the delivery per engine revolution of said injector pump mechanism, a conduit for fuel flowing to said injector pump mechanism, a metering restriction in said fuel conduit, means for controlling the ignition timing of said engine, means operable concurrently with said delivery varying means to yieldably apply to said ignition timing control means a force acting in a timing advance direction and increasing as said delivery is increased, and means responsive to the fuel pressure differential across said metering restriction to apply a force acting in a timing retarding direction to said ignition timing control means, said last-mentioned force increasing as said fuel pressure differential is increased.

10. A fuel supply system for an internal combustion engine, comprising injection pump mechanism for supplying fuel to the cylinders of said engine, means for varying the delivery of said pump mechanism, fluid motor means for operating said delivery varying means including a pair of expansible chambers separated by a movable wall, a motive fluid supply system for said motor means including a high pressure connection and a low pressure connection, control valve means for said fluid motor means, said control valve means having a normal position in which said motor means is not connected to said motive fluid supply system and operable upon movement from said normal position to connect one of said chambers to said low pressure connection, said connections being made selectively in accordance with the direction of movement of said valve means from said normal position, first spring means biasing said valve means for movement in one direction from said normal position, means responsive to conditions of engine operation for moving said valve means against said biasing means, a manually movable control device, clutch means for connecting said control device to said delivery varying means, second spring means biasing said clutch means to connect said control device and said delivery varying means, and means responsive to operation of said engine for operating said clutch means against said second spring means to disconnect said control device from said delivery varying means, said first spring means being effective when said engine is not operating to move said control valve means to an open position so that said chambers are connected thru said fluid supply system, thereby making said wall and said delivery varying means easily movable upon actuation of said control device.

11. A fuel supply system for an internal combustion engine, comprising injector pump mechanism for delivering fuel to the cylinders of said engine, means for varying the delivery of said pump mechanism including a member movable between zero delivery and maximum delivery positions, a stop movable between an active position wherein it limits the movement of said member in a delivery decreasing direction and thereby establishes the minimum fuel delivery and a retracted position wherein it permits movement of said member to said zero delivery position, means biasing said stop toward said active position, and manually operable means for moving said stop to said retracted position against said biasing means.

12. A fuel supply system as in claim 11, including means responsive to the rate of flow of combustion air to said engine for operating said delivery varying means.

13. A fuel supply system as in claim 11, including means associated with said stop to adjust the value of minimum fuel delivery determined by said stop.

LEIGHTON LEE, II.

REFERENCES CITED

The following references are of record in the file of this patent:

UNITED STATES PATENTS

| Number | Name | Date |
|---|---|---|
| 2,341,257 | Wunsch | Feb. 8, 1944 |
| 2,388,669 | Baker | Nov. 13, 1945 |

FOREIGN PATENTS

| Number | Country | Date |
|---|---|---|
| 113,026 | Australia | May 2, 1941 |